United States Patent

Fowler et al.

[15] 3,666,262

[45] May 30, 1972

[54] MAGNETIC CARD TRANSPORT

[72] Inventors: Raymond L. Fowler, Lexington, Ky.; Edward W. Parken; Larry H. Robbins, both of Austin, Tex.; Joe W. Woods, Lexington, Ky.

[73] Assignee: International Business Machines Corporation, Armonk, N.Y.

[22] Filed: Sept. 28, 1970

[21] Appl. No.: 76,128

[52] U.S. Cl. ....................................271/52, 271/3, 271/59, 271/DIG. 9

[51] Int. Cl. ....................................B65h 9/16

[58] Field of Search ....................................271/52, DIG. 9, 3, 51, 59, 271/49, 80

[56] References Cited

UNITED STATES PATENTS

| | | | |
|---|---|---|---|
| 3,178,175 | 4/1965 | Hohmann | 271/52 |
| 3,350,091 | 10/1967 | Masterson et al | 271/52 |
| 3,107,089 | 10/1963 | Lockey | 271/52 |
| 2,461,376 | 2/1949 | Feldmeier | 271/52 |
| 3,416,790 | 12/1968 | Davis | 271/51 |

*Primary Examiner*—Evon C. Blunk
*Assistant Examiner*—Bruce H. Stoner, Jr.
*Attorney*—Hanifin and Jancin and John L. Jackson

[57] ABSTRACT

A magnetic card transport which includes three drive rollers. A forward drive roller for driving the magnetic card toward the entry throat for recording character by character and for ejecting the card from the transport; a reverse drive roller for positioning the card in an opposite direction for read checking a previously recorded character; and a high speed reverse drive roller for positioning the card at the beginning of a track during initial entry from the throat and from the end of a previously recorded track. The three drive rollers continuously rotate beneath the card and the card is caused to move by application of a pinch roller to the card to press it into rolling contact with its associated drive roller. A fixed guide rail is provided and the card is biased against the fixed guide rail by means of guide springs. Further, to prevent misalignment of the card during reading and writing the pinch rollers associated with the forward and reverse drive rollers are canted such that the resultant moments of force are in a direction to bias the card against the fixed drive rail.

The entry/exit throat of the card transport, the drive rollers and the magnetic head are located such that optimum utilization of the recording area on the card is accomplished. In addition, a dual card switch located near the innermost extremity of the card bed is positioned such that it is not contracted during normal movement of the card, but in the event an operator attempts to insert another card and thereby force the original card further into the machine and out from under the pinch rollers, the switch is operative to signal the logic that an eject cycle must be entered into and the mechanical spring of the switch causes the card which tripped the switch to be flipped back into engagement with the drive rollers such that that card is also ejected.

5 Claims, 6 Drawing Figures

INVENTORS
RAYMOND L FOWLER
EDWARD W. PARKEN
LARRY H. ROBBINS
JOE W. WOODS

John L Jackson
ATTORNEY

*INVENTORS*
RAYMOND L. FOWLER
EDWARD W. PARKEN
LARRY H. ROBBINS
JOE W. WOODS

INVENTORS
RAYMOND L. FOWLER
EDWARD W. PARKEN
LARRY H. ROBBINS
JOE W. WOODS

MAGNETIC CARD TRANSPORT

CROSS REFERENCE TO RELATED APPLICATIONS

U. S. Application Ser. No. 802,700, filed Sept. 6, 1968, and now abandoned in favor of continuation Application Ser. No. 886,798, filed Dec. 19, 1969, entitled, "Data System with Printing, Composing, Communications, and Magnetic Card Processing Facilities," by Robert A. Kolpek, describes a system in which a magnetic card is used as the recording medium and the card is driven by means of one of three drive rollers which rotate down to press the card into the bed of the machine.

BACKGROUND OF THE INVENTION

1. Field of Invention

This invention relates to Magnetic Card Selectric Typewriter systems in general and more particularly to the card transport utilized therein. More particularly the card transport is operative to cause the card to move in recording association back and forth past a magnetic head which steps across the card to record a number of linear tracks.

2. Description of Prior Art

In the aforementioned Kolpek application, a magnetic card transport is provided which utilizes a magnetic card as a recording medium and the magnetic card is moved back and forth past a magnetic head which is stepped across the card to provide tracks of data along its length. The drive rollers for causing the card to move back and forth past the recording head which are selectively rotated down cause the card to be pressed between them and the transport bed are by necessity relatively large. In the Kolpek system this largeness can be tolerated since the magnetic head of the transport is located near the entrance/exit throat and the drive rollers are located inwardly of the transport system. This relative location of the head with respect to the drive rollers is not however desirable since during recording and reading operations, the magnetic card exits from the entrance throat and reenters the entrance throat for each track and therefore, the card is susceptible to fouling and contamination and additionally is directionwise extremely unstable. The latter partially results in a tendency of the magnetic card to move laterally during recording and reading operations. Instability further results from the lack of means for preventing canting of the card during movement. This partial instability could be alleviated by relocating the head inwardly of the drive rollers but this would result in loss of recording area due to the requisite large diameter of the rollers since the roller size would determine how close the magnetic head could be placed relative to the end of the card. Finally, since the card is moved by causing the relatively large drive rollers to press the card between the card bed and the drive rollers variations in velocity occur due to variations in the coefficient of friction along the length of the card which affect recording and reading operations.

SUMMARY OF INVENTION

Briefly, there is provided a magnetic card transport for moving a magnetic card incrementally past a magnetic head which can both read from a card and write onto the card. The magnetic head is located inwardly of the system with respect to three drive rollers. The drive rollers include a forward drive roller, a low speed reverse drive roller and a high speed reverse drive roller which continuously rotate beneath a card bed and are accessible to a magnetic card lying on the bed through an opening. In operable association above the continuously rotating drive rollers, are three pinch rollers which are selectively brought down into contact with the magnetic card to cause the card to be propelled by means of the selected drive roller. The pinch rollers associated with the forward drive roller and reverse slow speed drive are canted such that the card is biased into a fixed guide rail during motion to provide directional control during the recording and reading. The pinch rollers can be made quite small since they only provide a normal force to the card which allows the magnetic head to be placed closely adjacent the rolling contact points whereby a maximum recording area on the card is provided. Additionally, the pinch rollers are placed with respect to the magnetic head such that the handled area of the card does not pass under the head during the recording and reading operation to alleviate fouling problems. There is also a two card switch located at the furthermost inward extremity of the card drive which normally is not contacted by the card as it reciprocates past the magnetic head, but is operative when a second card is inserted which forces the original card out of the drive rollers to signal to the control logic that an eject cycle must be entered into. When this occurs the forward pinch roller is brought down into contact with the second card to cause it to be driven out through the throat of the transport and the mechanical spring action of the switch flips the original card back into the pinch roller area and it is likewise ejected.

DETAILED DESCRIPTION OF THE DRAWINGS

Figure 1:
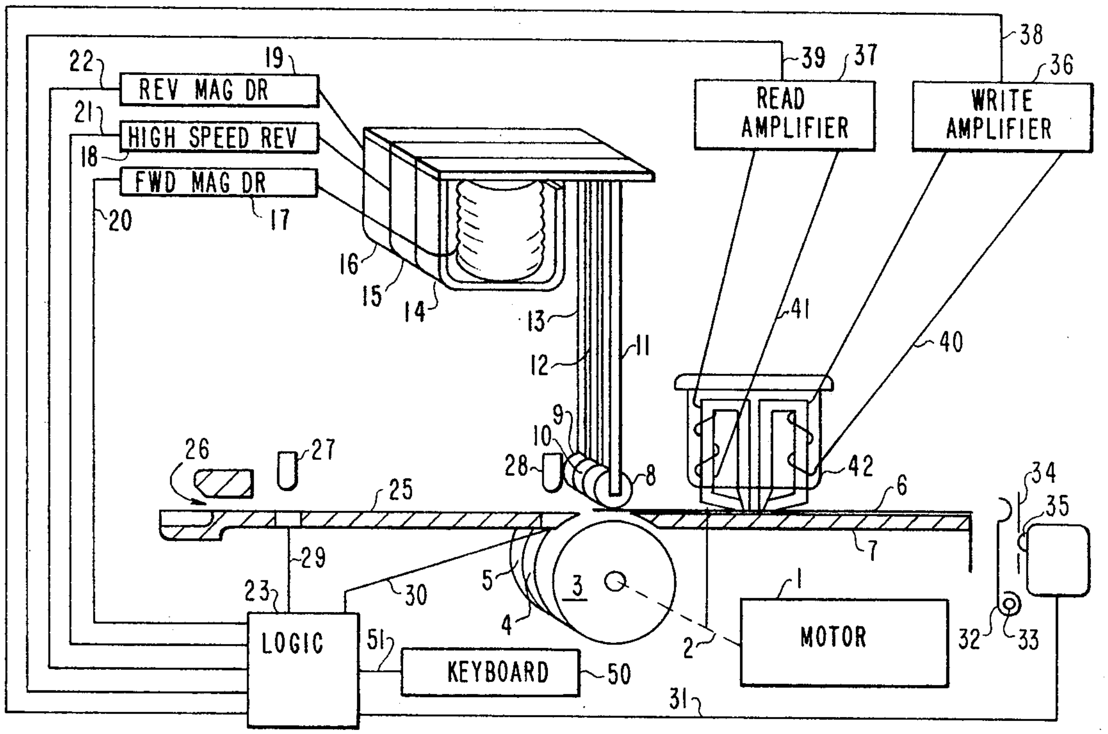
FIG. 1 is an overall view showing a side view of the magnetic card transport along with associated logic and controls.

Refer first to FIG. 1 which illustrates a cut away perspective side view of the card transport, which is the subject of the present application. A motor 1 is connected by means 2 to the three drive rollers 3, 4 and 5. The drive rollers are continuously rotated by the motor 1 and by appropriate gearing and belts not shown. Drive roller 3 is the forward drive roller; drive roller 4 is the high speed reverse drive roller; and drive roller 5 is the low speed reverse drive roller. Drive roller 3 is rotated in a counterclockwise direction and therefore as illustrated in FIG. 1, is operative to move the card to the left past the magnetic head indicated at 42 for card eject, reading and recording, while drive roller 5 rotates in a clockwise direction and thus is operative to move the card to the right past the magnetic head 42 to position the card for character read checking. Drive roller 4, on the other hand, is a high speed reverse drive roller which rotates in a clockwise direction and is utilized to position the card at the beginning of a track during entry from the throat 26 and from the end of a previous track.

As further shown in FIG. 1, the card transport bed include sections 7 and 25. The card 6 rests on the card bed during the entry cycle, eject cycle and the recording and reading operation. A magnetic head is in operative recording and reading association with the card 6, when the card is in the position as shown in FIG. 1. The magnetic head is connected by means of lines 40 and 41 to read amplifiers 36 and 37 respectively, which in turn are connected by means of lines 38 and 39 to a logic unit 23. The logic unit 23 in turn is connected by means of line 51 to an input keyboard 50. Keyboard 50 may be a conventional typewriter printer with appropriate coding to accomplish the recording and reading operation.

Further as shown in FIG. 1, the logic unit 23 is connected by means of lines 20, 21, and 22 to three magnet drivers. The forward magnet drive 17, high speed magnet driver 18 and the reverse magnet driver 19 are in turn connected to the forward electro-magnet 14, the high speed reverse electro-magnet 15 and the reverse low speed electro-magnet 16. Operation of the normally open electro-magnets is selectively accomplished under control of the logic unit 23 in accordance with the desired operation. When a magnet is picked, the L shape armature of the magnet is brought down to cause the desired pinch roller to come into contact with the magnetic card and force it into driving contact with the associated drive roller.

Thus, energization of magnet 14 will cause armature 11 to move down into operable association with forward drive roller 3 to cause card 6 to be moved in the forward or left hand direction, while energization of magnet 15 will cause armature 12 to force pinch roller 9 into contact with card 6 which will cause card 6 to be moved in a high speed direction to the right past magnet head 42, to position the card for a new recording cycle. Finally, energization of magnet 16 will cause armature 13 to move pinch roller 10 into contact with card 6 which will accomplish reverse or right hand driving of the card 6 past the magnetic head 42.

In light of the above, it will be appreciated then that the three magnets can be selectively energized to cause their associated pinch rollers to come into working association with their associated drive rollers, to cause the card to move forward and reverse past the magnetic head for recording and reading operations and in a high speed manner to position the card such that a new line of data can be recorded. Not shown in FIG. 1, is the means for moving the magnetic head back and forth across the width of the card, since this is not considered to be part of the subject invention since a number of closeby spaced heads across the width of the card could be used. However, it should be understood that it is desirable to use a single head which is moved back and forth across the card selectively for recording of tracks. It is during the high speed return of the card that the head is stepped. In addition, the lights 27 and 28 which are associated with photocells not shown, are not necessary to the subject invention and are shown merely to illustrate a technique of providing an input to the logic function 23 to indicate the position of a card on the bed 25. The reason for this is that when the light from both lights 27 and 28 is interrupted and the machine is turned on, the card should automatically be ejected. The lights are also used to determine track beginning and ending, that is when a card interrupts the light from light 27, the only allowable character is a line terminate code and therefore, light 27 indicates that the end of the recorded line must occur. On the other hand, light 28 indicates when recording can be initiated.

Also shown in FIG. 1, is a two card switch located at the innermost extremity of the card transport. The switch includes a spring member 32, which is pivoted about point 33. The switch point is indicated by line 34. The switch point and spring member 32 are located such that the card 6 can move back and forth under the magnetic head 42 in normal recording and reading fashion without contacting the spring. However, should an additional card be inserted by the operator, the card which is in the machine at the recording station will be forced out from under the pinch rollers and into contact with spring member 32, which in turn will depress spring switch 35 and signal along line 31 to the logic that an eject cycle must be entered into. At that time the eject logic will cause the forward drive roller 3 to come into engagement with the second card and cause it to be driven out of the throat 26 and when the second card releases pressure or force from the first card, spring member 32 will flip the card 6 back between the pinch and drive rollers and cause it likewise to be ejected.

Figure 2:
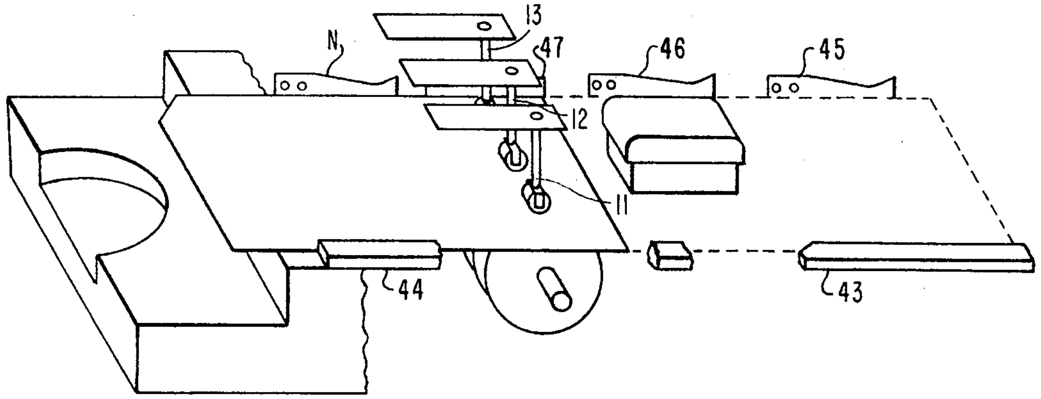
FIG. 2 is a perspective of the card transport illustrating the fixed guide rails and the biasing springs.

Refer next to FIG. 2, which illustrates a perspective view showing the relative placements of the fixed guide rail 43 and 44 and the biasing springs 45, 46, 47–*n*. As shown the biasing springs 45 through *n* force the magnetic card into contact with the fixed rails 43 and 44. This biasing action causes the card to be held in against the fixed guide rail to keep the card in alignment during entry and high speed return to the beginning of a track. However, in spite of the biasing action of the springs, it was found that direction control of the card was extremely difficult to maintain with the velocities required. That is in the preferred mode of operation of the recording system, a character is first recorded on the card, the card is then moved back and the character then read prior to initiation of the recording of the next character. To accomplish high speed recording, high card velocities are required and thus, very high acceleration forces are applied to the card. For example, even in a slow speed card transport the card must be accelerated up to 5 inches per second in 2 ms and due to these acceleration forces the biasing action of the springs tended to be overcome and erratic card movement occurred. The problem is of course much greater in a high speed card transport in which the card must be accelerated up to 35 inches per second in 5 ms.

Figure 3A:
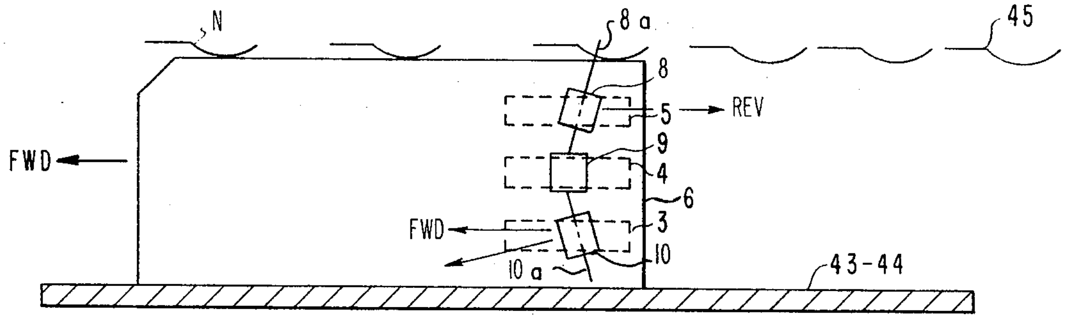
FIG. 3*a* is a view showing the canting of the pinch rollers along with indicated moments of force which cause the magnetic card to be driven into the fixed guide rail during movement of the magnetic card toward the throat.
Figure 3B:
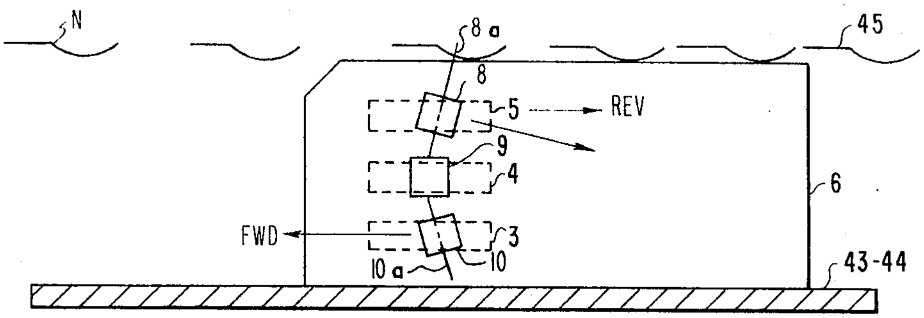
FIG. 3*b* illustrates the canting of the reverse drive roller such that the card is biased into the fixed guide rail during movement of the card into the system.

Refer next to FIGS. 3*a* and 3*b*. In FIGS. 3*a* and 3*b*, there is illustrated the canting of the pinch rollers associated with drive rollers 8 and 10 to accomplish biasing of the card against the fixed drive rail, such that no directional variations are presented even though extremely high acceleration forces are applied to the card. As illustrated in FIG. 3*a*, the axis of rotation of pinch roller 10 is canted with respect to the axis of rotation of drive roller 5, which is normal to fixed guide rail 43–44 such that there is a resultant force, illustrated by arrow 51, applied to the card which is forward and against the fixed guide rail. On the other hand, as illustrated in FIG. 3*b*, the axis of rotation of pinch roller 8 is canted relative to its axis of rotation of associated drive roller 3, which is normal to fixed guide rail 43–44 such that the moment of force, illustrated by arrow 52, is to the right or in the reverse direction and is also toward the fixed guide rail 44. Thus, the canting of the pinch rollers effectively causes the card to be biased against the fixed guide rail and in addition, causes the card to be driven in the desired direction. The axis of rotation of pinch roller 9, as illustrated, is not canted with respect to its associated drive roller 4, which is normal to fixed guide rail 43–44 since when pinch roller 9 is picked a high speed move to the initial or starting position of the next track is accomplished and during this movement no recording or reading is done.

With respect to the above, it should further be noted, that at the beginning of a track a dummy character is recorded which serves two purposes. First, it is required due to the type of recording employed and secondly, the recording of this character, due to the canting of the pinch rollers, firmly seats the card against the fixed guide rail.

Figure 4:
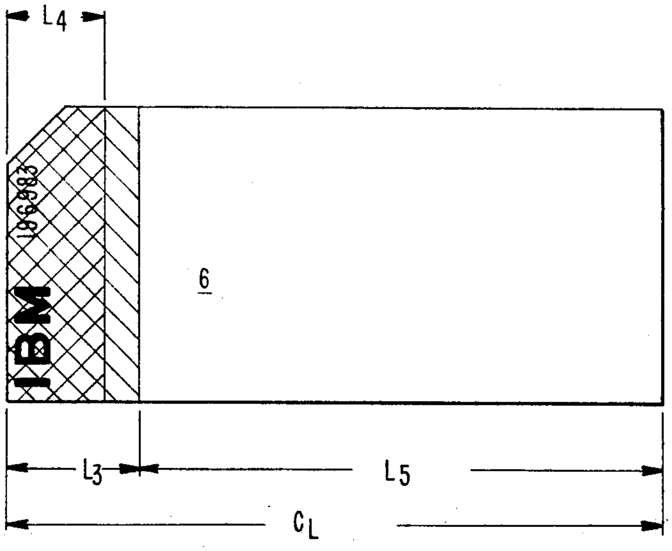
FIG. 4 is a view illustrating the magnetic card employed in the present system.
Figure 5:
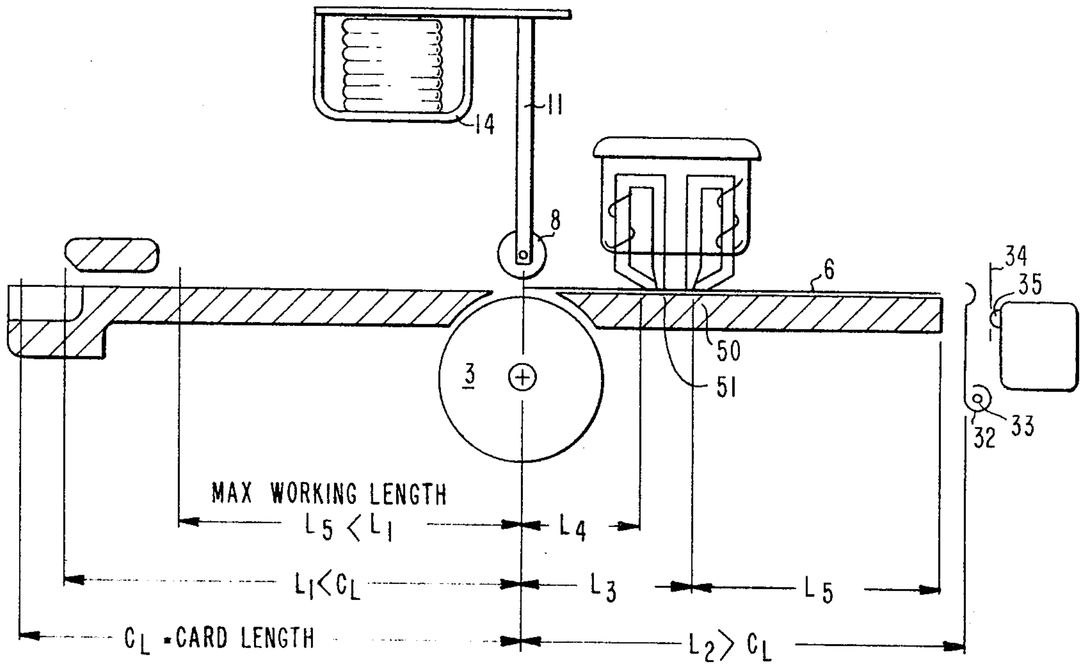
FIG. 5 is a side view illustrating the relative locations of the entrance throat, pinch and drive rollers, magnetic head and two card switch.

Refer next to FIG. 4 of the application, which shows the magnetic card which is utilized in the subject card transport. The recording area on the card 6 is designated by the length $L_5$. The nonusable portion or visual operator handling area is designated by $L_4$ and the total non-record area is $L_3$. Thus, the space between $L_4$ and $L_3$ is neither designated as operator handling area nor a recording area, but instead is blank space which is included as an operator handling safety factor. Thus the actual total handling area is $L_3$ and the working area is $L_5$. The significance of these dimensions will be further appreciated by referring to FIG. 5. In FIG. 5, the length of the card is tied into the relative location of the common entry/exit throat 26 of the card transport, the lights which indicate when the first and last character can occur, the pinch roller, the magnetic head and two card switch. In connection with FIG. 5, symbolism is used in which $L_1$ = the distance from the center line of the drive rollers to the edge of the throat; $L_2$ = the distance from the center line of the drive rollers to the switch point; $L_3$ = the unrecorded front portion of the card; $L_4$ = the length of the card that does not pass under the magnetic head and; $L_5$ = the maximum recorded length of the card.

From a consideration of FIG. 5, it can be seen that during the recording and reading operation, the card never emerges out of the throat of the card transport and additionally, during the normal record and reading operation the card never contacts the two card switch. Likewise, the visual operator handling area and blank safety factor area on the card never pass under the magnetic head and thus, do not tend to foul the head. Finally, it can be seen by reference to FIG. 5, that due to the smallness of the pinch rollers, the magnetic head can be placed such that there is very little wasted space on the card and the only area which is not available for recording is utilized for the operator handling area with a small amount of area left over to alleviate operator mishandling. Thus, with the above described and illustrated locationing of the components recording and reading can be accomplished with the card never exiting from the throat and with the operator handling area never passing under the magnetic head together with optimum use of the available recording area on the card.

While the invention has been particularly shown and described with reference to preferred embodiments thereof, it will be understood by those skilled in the art that various changes in the form and details may be made therein without departing from the spirit and scope of the invention.

What is claimed is:

1. A transport for moving a card having two parallel sides along a linear path relative to a transducer to record/read data tracks along its length parallel to the parallel sides comprising:

a card bed including a fixed guide rail positioned parallel to said linear path and means for biasing one of said parallel edges of said card against said fixed guide rail;

said card bed including a common entry and exit throat for supporting said card in operable association with said transducer and said card bed further including a forward drive roller and a reverse drive roller rotating in opposite directions in said opening with a pinch roller associated with each of said drive rollers with the axis of rotation of said drive rollers being normal with respect to said guide rail and the axis of rotation of one of said pinch rollers is at an angle with respect to said normal and the axis of rotation of the other said pinch roller is at an opposite angle to said normal; and means for selectively moving said pinch rollers to selectively apply a normal force to said card when said card is located above said opening.

2. The transport apparatus of claim 1 further including a third drive roller in said card bed opening rotating at a higher speed than either of said forward or reverse drive rollers with an associated pinch roller and means for selectively moving said pinch roller to selectively apply a normal force to said card when said card is located above said opening and further with the axis of rotation of both said third drive roller and associated pinch roller being normal relative to said fixed rail.

3. The transport apparatus of claim 2 wherein said means for biasing further includes a number of springs on said bed operative against the other of said parallel edges of said card.

4. The transport apparatus of claim 3 wherein said card includes a handling area and a working area along its length and the distance between the axis of rotation of said forward drive roller and said throat is such that as said working area moves past said transducer said card does not extend out of said throat.

5. The transport of claim 4 further including a two card switch located at the opposite extremity of said bed from said throat a distance from the axis of rotation of said reverse drive roller greater than the total length of said card and with said two card switch having a spring member operative upon deflection by a card to operate said switch and mechanically return the card back between said forward drive roller and its associated pinch roller.

* * * * *

PO-1050
(5/69)

UNITED STATES PATENT OFFICE
CERTIFICATE OF CORRECTION

Patent No. 3,666,262 Dated August 9, 1972

Inventor(s) Raymond L. Fowler, et. al.

It is certified that error appears in the above-identified patent and that said Letters Patent are hereby corrected as shown below:

Claim 1; line 22 after "including", insert -- an opening intermediate it's extremities and --

Signed and sealed this 23rd day of January 1973.

(SEAL)
Attest:

EDWARD M.FLETCHER,JR.
Attesting Officer

ROBERT GOTTSCHALK
Commissioner of Patents